(12) United States Patent
Seta et al.

(10) Patent No.: US 11,920,936 B2
(45) Date of Patent: Mar. 5, 2024

(54) VEHICLE CONTROLLER, AND METHOD AND COMPUTER PROGRAM FOR CONTROLLING VEHICLE

(71) Applicant: TOYOTA JIDOSHA KABUSHIKI KAISHA, Toyota (JP)

(72) Inventors: Takahiro Seta, Yokohama (JP); Ryuta Hashimoto, Tokyo-to (JP); Kota Harada, Tokyo-to (JP); Soichi Yoshino, Ichikawa (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 26 days.

(21) Appl. No.: 17/656,792

(22) Filed: Mar. 28, 2022

(65) Prior Publication Data

US 2022/0307842 A1  Sep. 29, 2022

(30) Foreign Application Priority Data

Mar. 29, 2021  (JP) ................................. 2021-055612

(51) Int. Cl.
*G01C 21/32* (2006.01)
(52) U.S. Cl.
CPC .................................. *G01C 21/32* (2013.01)
(58) Field of Classification Search
CPC . G01C 21/32; G01C 21/30; B60W 30/18163; B60W 2420/42; B60W 2552/53; B60W 2556/40; B60W 2556/50; B60W 60/001; B60W 2556/45
See application file for complete search history.

(56) References Cited

U.S. PATENT DOCUMENTS

| | | | |
|---|---|---|---|
| 2018/0284799 A1 | 10/2018 | Tokunaga et al. | |
| 2020/0309541 A1* | 10/2020 | Lavy | G06V 20/588 |
| 2020/0339119 A1* | 10/2020 | Ohmura | B60W 30/12 |

FOREIGN PATENT DOCUMENTS

| | | |
|---|---|---|
| EP | 3882885 A1 | 9/2021 |
| JP | 2018172052 A | 11/2018 |
| JP | 2019117059 A | 7/2019 |
| JP | 2020045038 A | 3/2020 |
| WO | 2020184013 A1 | 9/2020 |

* cited by examiner

*Primary Examiner* — Rami Khatib
(74) *Attorney, Agent, or Firm* — Dickinson Wright, PLLC

(57) ABSTRACT

A vehicle controller determines whether the position of a detected travel lane relative to an edge of a road being traveled by a vehicle may differ from an actual position; estimates a first required time for an action, which is required before the vehicle reaches a predetermined location, for the case that the position of the detected lane relative to the edge of the road is correct; estimates a second required time for the action for the case that the position of the detected lane differs from the actual position by a predetermined number of lanes; and sets start timing of the action, based on the second required time, so that the action will finish before the vehicle reaches the predetermined location, when the position of the detected lane may differ from the actual position and the second required time is longer than the first required time.

13 Claims, 6 Drawing Sheets

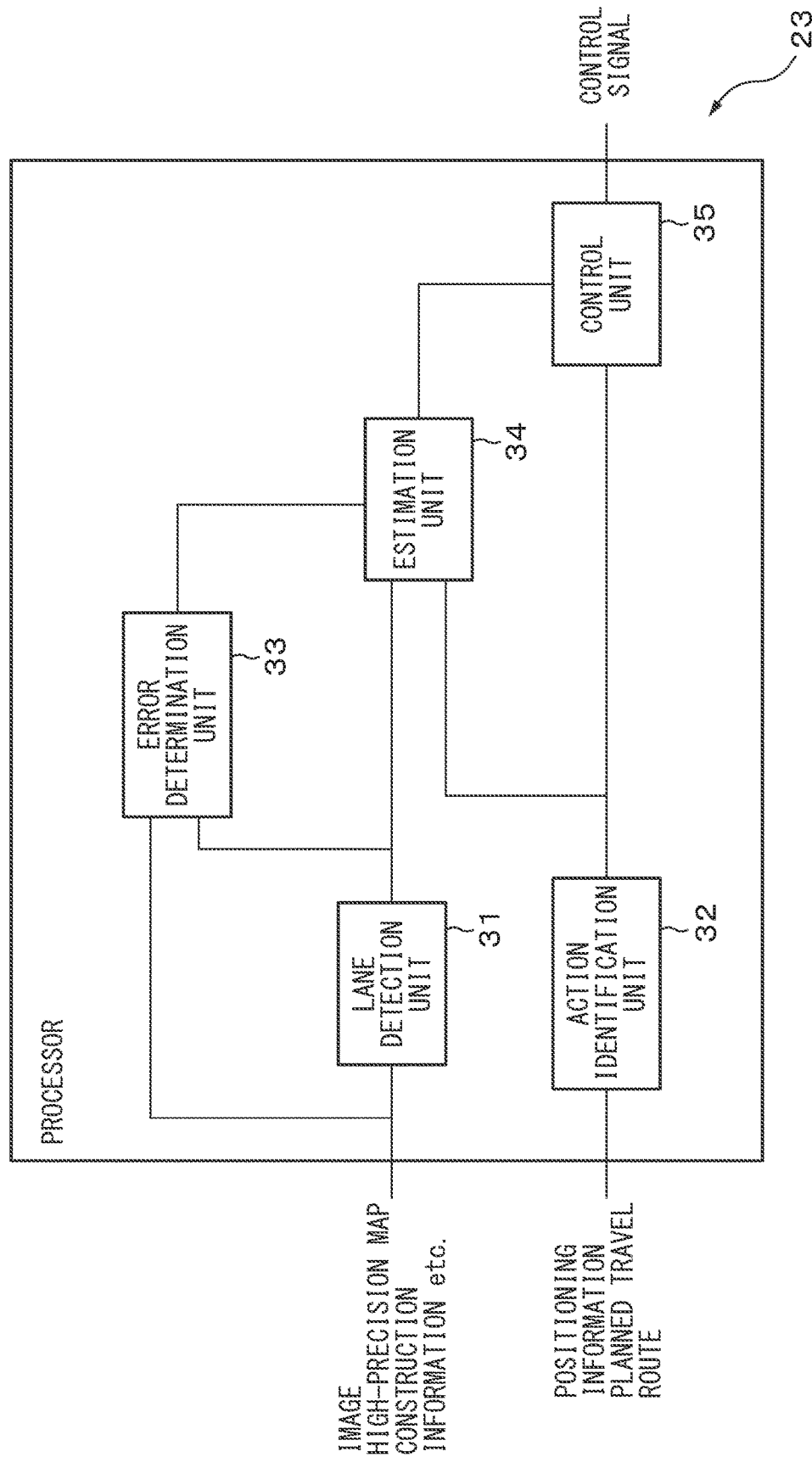

VEHICLE CONTROLLER, AND METHOD AND COMPUTER PROGRAM FOR CONTROLLING VEHICLE

FIELD

The present invention relates to a vehicle controller, and a method and a computer program for controlling a vehicle.

BACKGROUND

In autonomous driving control of a vehicle, a vehicle controller executes a localization process for detecting a lane being traveled by the vehicle, which may be referred to as a "travel lane" below, and executes vehicle control, including a lane change, as necessary, based on the result of the localization process. To appropriately control a vehicle for autonomous driving, a technique for accurately detecting its travel lane has been proposed (see Japanese Unexamined Patent Publication No. 2019-117059).

An electronic device disclosed in Japanese Unexamined Patent Publication No. 2019-117059 identifies the position of a lane being traveled by a host vehicle by referring to a detected position of the host vehicle and lane information included in map data, and determines whether an error occurs in identification of the position of the lane of the host vehicle based on the lane information of the map data. When it is determined that an error occurs, the electronic device decreases the reliability of the identified position of the lane.

Additionally, a technique for controlling a lane change on the basis of another vehicle traveling on a lane adjoining a travel lane, which may be simply referred to as an "adjoining lane" below, has been proposed (see Japanese Unexamined Patent Publication No. 2020-45038).

A method for controlling a vehicle disclosed in Japanese Unexamined Patent Publication No. 2020-45038 includes obtaining, from a sensor for detecting the surroundings of a host vehicle, detection data of other vehicles traveling on an adjoining lane, and identifying a first vehicle and a second vehicle behind the first vehicle from among these vehicles. The method further includes setting a lane change feasible zone, in which the host vehicle can change lanes, on the adjoining lane between the first and second vehicles, and setting a lane change start point on a travel lane ahead of the center of the lane change feasible zone in the direction of the travel lane. The method further includes executing lane change control for the host vehicle to make a lane change from the travel lane to the adjoining lane so that the host vehicle decelerates from the lane change start point toward the lane change feasible zone.

SUMMARY

In some cases, a vehicle controller has difficulty in correctly detecting a travel lane even by the technique disclosed in Japanese Unexamined Patent Publication No. 2019-117059. For example, when a lane-dividing line is blurred, it is difficult to correctly detect a travel lane. In such difficulty in detecting a travel lane, a vehicle controller may fail to appropriately execute predetermined vehicle control, such as the lane change control disclosed in Japanese Unexamined Patent Publication No. 2020-45038.

It is an object of the present invention to provide a vehicle controller that enables a vehicle to finish a predetermined action before the vehicle reaches a predetermined position even if the result of detection of its travel lane is incorrect.

According to an embodiment, a vehicle controller is provided. The vehicle controller includes a processor configured to: compare a sensor signal representing surroundings of a vehicle with a map including information on lanes of a road being traveled by the vehicle to detect a lane being traveled by the vehicle among the lanes, the sensor signal being obtained by a sensor mounted on the vehicle, determine whether the position of the detected lane relative to an edge of the road being traveled by the vehicle may differ from an actual position, identify an action required of the vehicle before the vehicle reaches a predetermined location being away from the current position of the vehicle by a predetermined distance, based on a travel route of the vehicle, estimate a first required time or a first required distance for the identified action for the case that the position of the detected lane relative to the edge of the road being traveled by the vehicle is correct, estimate a second required time or a second required distance for the identified action for the case that the position of the detected lane relative to the edge of the road differs from the actual position by a predetermined number of lanes, set start timing of the identified action, based on the second required time or the second required distance, so that the action will finish before the vehicle reaches the predetermined location, when the position of the detected lane relative to the edge of the road being traveled by the vehicle may differ from the actual position and the second required time or the second required distance is longer than the first required time or the first required distance, and set the start timing of the identified action, based on the first required time or the first required distance, so that the action will finish before the vehicle reaches the predetermined location, when the position of the detected lane relative to the edge of the road being traveled by the vehicle does not differ from the actual position or when the first required time or the first required distance is longer than the second required time or the second required distance.

The processor of the vehicle controller preferably determines that the position of the detected lane relative to the edge of the road being traveled by the vehicle may differ from the actual position, when construction information received from another device indicates that road construction is carried out during a predetermined period including the current time in a section from the current position of the vehicle to the predetermined distance away.

Alternatively, the processor preferably determines that the position of the detected lane relative to the edge of the road being traveled by the vehicle may differ from the actual position, when the date and time of the latest update of the map is a predetermined period or more earlier than the current time or when the map and a route-search-purpose map used by a navigation device for searching for the travel route of the vehicle differ in road structure in a section from the current position of the vehicle to the predetermined distance away.

Alternatively, the processor preferably determines that the position of the detected lane relative to the edge of the road being traveled by the vehicle may differ from the actual position, when a trajectory of another vehicle in a section from the current position of the vehicle to the predetermined distance away passes through an area in the map impassable to the vehicle.

Alternatively, the processor preferably determines that the position of the detected lane relative to the edge of the road being traveled by the vehicle may differ from the actual position, until a certain time elapses or the vehicle travels a certain distance from the start of detection of the lane being traveled by the vehicle.

Additionally, the processor preferably determines that the position of the detected lane relative to the edge of the road being traveled by the vehicle may differ from the actual position, when the number of lanes represented in the map or the sensor signal at the current position of the vehicle is not less than a predetermined number and the detected lane is located within a predetermined range of the center of lanes at the current position.

Additionally, the processor preferably determines that the position of the detected lane relative to the edge of the road being traveled by the vehicle may differ from the actual position, when the number of lanes at the current position differs from the number of lanes at the position of the vehicle a predetermined time ago by a predetermined number or more.

Additionally, the processor preferably determines that the position of the detected lane relative to the edge of the road being traveled by the vehicle may differ from the actual position, when the position of a predetermined feature detected from the sensor signal differs from the position of a corresponding feature in the map relative to the position of the detected lane.

Additionally, the processor preferably determines that the position of the detected lane relative to the edge of the road being traveled by the vehicle may differ from the actual position, when a confidence score of a predetermined feature detected from the sensor signal is not higher than a predetermined confidence-score threshold.

Additionally, the processor preferably determines that the position of the detected lane relative to the edge of the road being traveled by the vehicle may differ from the actual position, when no vehicle traveling in an area relative to the position of the detected lane can be detected during a certain period. The area is represented by the sensor signal and corresponds to an area in the map passable to the vehicle.

Additionally, the processor preferably determines that the position of the detected lane relative to the edge of the road being traveled by the vehicle may differ from the actual position, when the current position of the vehicle is within a predetermined range of an error occurrence point predefined in the map.

According to another embodiment, a method for controlling a vehicle is provided. The method includes: comparing a sensor signal representing surroundings of the vehicle with a map including information on lanes of a road being traveled by the vehicle to detect a lane being traveled by the vehicle among the lanes. The sensor signal is obtained by a sensor mounted on the vehicle. The method further includes determining whether the position of the detected lane relative to an edge of the road being traveled by the vehicle may differ from an actual position; and identifying an action required of the vehicle before the vehicle reaches a predetermined location being away from the current position of the vehicle by a predetermined distance, based on a travel route of the vehicle. The method further includes estimating a first required time or a first required distance for the identified action for the case that the position of the detected lane relative to the edge of the road being traveled by the vehicle is correct, estimating a second required time or a second required distance for the identified action for the case that the position of the detected lane relative to the edge of the road differs from the actual position by a predetermined number of lanes, setting start timing of the identified action, based on the second required time or the second required distance, so that the action will finish before the vehicle reaches the predetermined location, when the position of the detected lane relative to the edge of the road being traveled by the vehicle may differ from the actual position and the second required time or the second required distance is longer than the first required time or the first required distance, and setting the start timing of the identified action, based on the first required time or the first required distance, so that the action will finish before the vehicle reaches the predetermined location, when the position of the detected lane relative to the edge of the road being traveled by the vehicle does not differ from the actual position or when the first required time or the first required distance is longer than the second required time or the second required distance.

According to still another embodiment, a non-transitory recording medium that stores a computer program for controlling a vehicle is provided. The computer program includes instructions causing a processor mounted on the vehicle to execute a process including comparing a sensor signal representing surroundings of the vehicle with a map including information on lanes of a road being traveled by the vehicle to detect a lane being traveled by the vehicle among the lanes. The sensor signal is obtained by a sensor mounted on the vehicle. The process further includes determining whether the position of the detected lane relative to an edge of the road being traveled by the vehicle may differ from an actual position; and identifying an action required of the vehicle before the vehicle reaches a predetermined location being away from the current position of the vehicle by a predetermined distance, based on a travel route of the vehicle. The process further includes estimating a first required time or a first required distance for the identified action for the case that the position of the detected lane relative to the edge of the road being traveled by the vehicle is correct, estimating a second required time or a second required distance for the identified action for the case that the position of the detected lane relative to the edge of the road differs from the actual position by a predetermined number of lanes, setting start timing of the identified action, based on the second required time or the second required distance, so that the action will finish before the vehicle reaches the predetermined location, when the position of the detected lane relative to the edge of the road being traveled by the vehicle may differ from the actual position and the second required time or the second required distance is longer than the first required time or the first required distance, and the setting start timing of the identified action, based on the first required time or the first required distance, so that the action will finish before the vehicle reaches the predetermined location, when the position of the detected lane relative to the edge of the road being traveled by the vehicle does not differ from the actual position or when the first required time or the first required distance is longer than the second required time or the second required distance.

The vehicle controller according to the present invention has an advantageous effect of enabling a vehicle to finish a predetermined action before the vehicle reaches a predetermined position even if the result of detection of its travel lane is incorrect.

BRIEF DESCRIPTION OF DRAWINGS

FIG. 4 is a functional block diagram of a processor of the electronic control unit, related to a vehicle control process.

DESCRIPTION OF EMBODIMENTS

A vehicle controller as well as a method and a computer program for controlling a vehicle executed by the vehicle controller will now be described with reference to the attached drawings. The vehicle controller compares a sensor signal representing surroundings of a vehicle with a map including information on lanes of a road being traveled by the vehicle to detect the lane being traveled by the vehicle among the lanes. The sensor signal is obtained by a sensor mounted on the vehicle. The vehicle controller determines whether the position of the detected lane relative to an edge of the road being traveled by the vehicle may differ from its actual position. The vehicle controller further identifies an action required of the vehicle before the vehicle reaches a predetermined location being away from the current position of the vehicle by a predetermined distance, based on at least one of the current position and a destination of the vehicle. Additionally, the vehicle controller estimates a first required time or a first required distance for finishing the identified action for the case that the position of the detected lane is correct. Additionally, the vehicle controller estimates a second required time or a second required distance for finishing the identified action for the case that the position of the detected lane is actually shifted by a predetermined number of lanes. The vehicle controller then determines start timing of the identified action, based on the second required time or the second required distance, when the position of the detected lane may differ from its actual position and the second required time or the second required distance is longer than the first required time or the first required distance. In this way, the vehicle controller enables the vehicle to finish the identified action before a target position or timing even if the position of the detected lane is incorrect.

Figure 1:
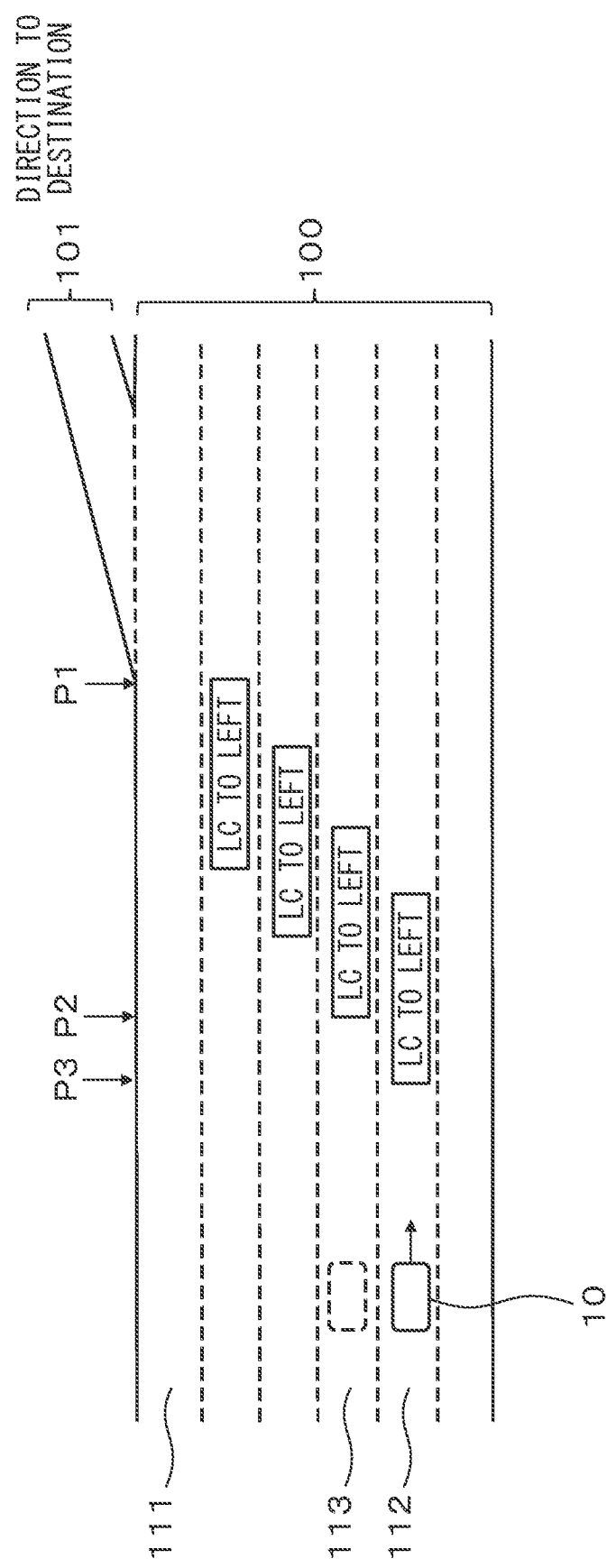
FIG. 1 illustrates an example of the relationship between the result of detection of a travel lane and the start timing of a predetermined action.

FIG. 1 illustrates an example of the relationship between the result of detection of a travel lane and the start timing of a predetermined action. In the example illustrated in FIG. 1, a vehicle 10 is traveling on a road 100 having six lanes, and the predetermined action is to make lane changes to the leftmost lane 111 of the road 100 before reaching a location P1 at which a road 101 leading to a destination diverges from the left edge of the road 100. The vehicle 10 is traveling on the second lane 112 from the right edge of the road 100. In this case, four lane changes are necessary before the vehicle 10 reaches the lane 111. However, assume that a lane 113 adjoining the lane 112 on its left is erroneously detected as the travel lane. In this case, it is recognized that three lane changes are necessary before the vehicle 10 reaches the lane 111. For this reason, if the vehicle 10 starts the lane changes at a location P2 so as to reach the lane 111 before the divergent location P1 on the assumption that the vehicle 10 is traveling on the lane 113, the vehicle 10 may not reach the lane 111 when the vehicle 10 reaches the divergent location P1.

In the present embodiment, in the case that the lane 113 is detected as the travel lane, a required time t1 or a required distance d1 for lane changes from the lane 113 to the lane 111 is estimated. Additionally, a required time t2 or a required distance d2 for lane changes from the lane 112 to the lane 111 is estimated on the assumption that the position of the travel lane is actually shifted by one lane and that the vehicle 10 is traveling on the lane 112. Then, start timing of the lane changes is set, based on the longer of the required time t1 or distance d1 and the required time t2 or distance d2. In this example, since the required time t2 or distance d2, for more lane changes by one, is longer than the required time t1 or distance d1, the lane changes are started at a location P3 nearer than the location P2 so that the vehicle 10 can move to the leftmost lane 111 before reaching the location P1. For this reason, the lane changes to the target lane 111 will finish before the vehicle 10 reaches the location P1, even if the position of the detected lane relative to an edge of the road 100 differs from its actual position.

Figure 2:
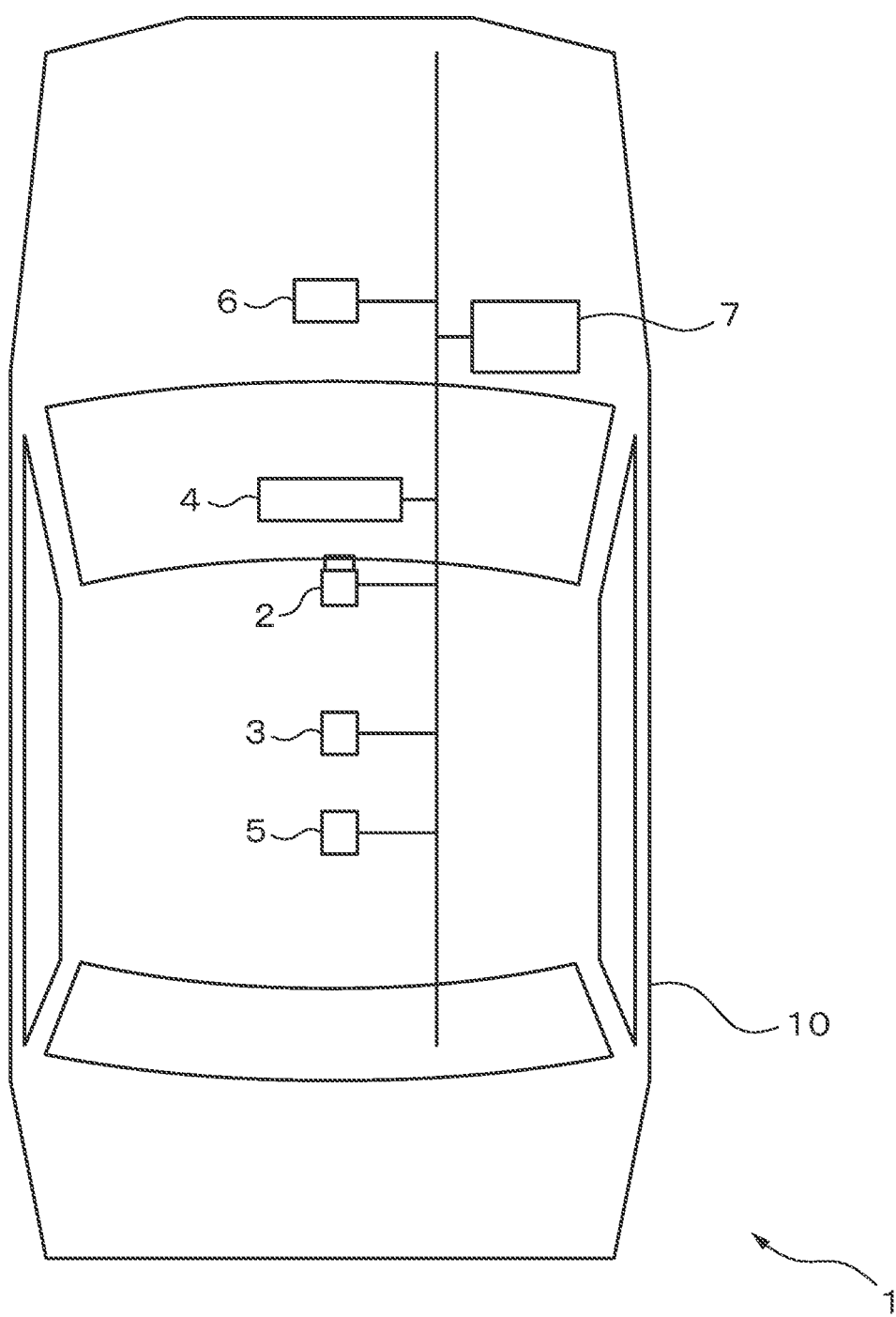
FIG. 2 schematically illustrates the configuration of a vehicle control system equipped with a vehicle controller.
Figure 3:
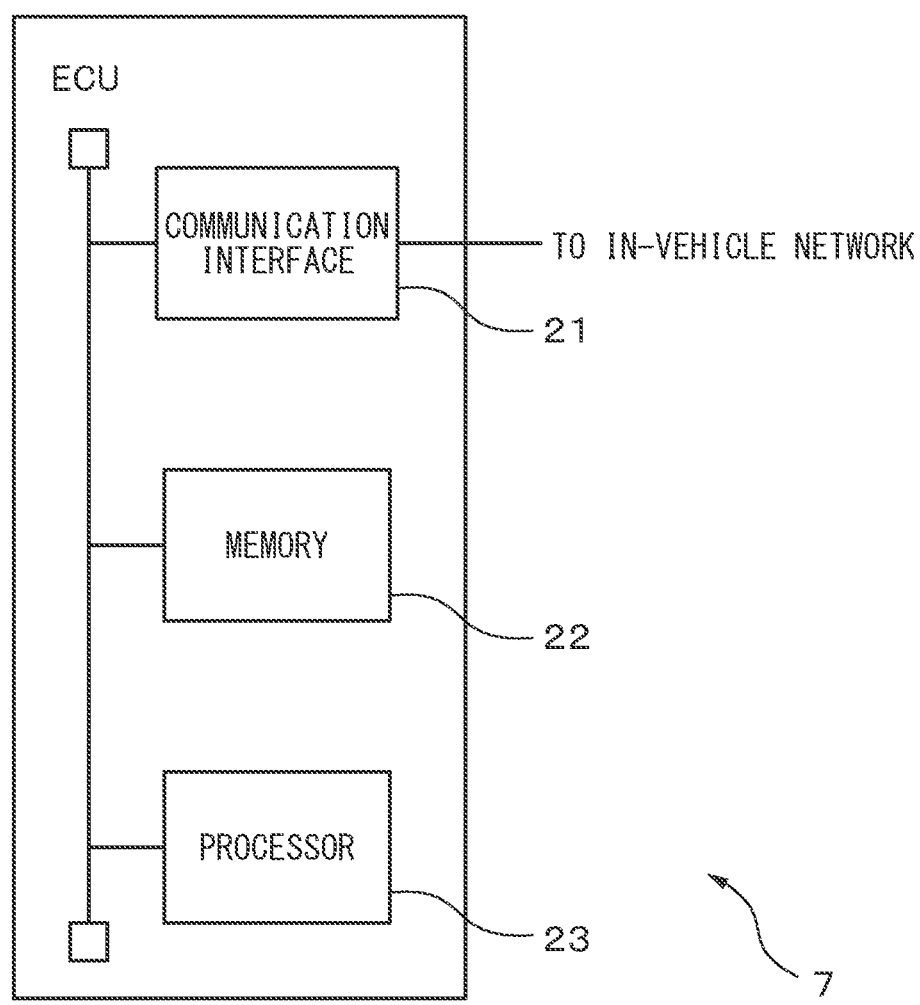
FIG. 3 illustrates the hardware configuration of an electronic control unit, which is an embodiment of the vehicle controller.

FIG. 2 schematically illustrates the configuration of a vehicle control system equipped with the vehicle controller. FIG. 3 illustrates the hardware configuration of an electronic control unit, which is an embodiment of the vehicle controller. In the present embodiment, the vehicle control system 1, which is mounted on the vehicle 10 and controls the vehicle 10, includes a camera 2, a GPS receiver 3, a navigation device 4, a wireless communication device 5, a storage device 6, and an electronic control unit (ECU) 7, which is an example of the vehicle controller. The camera 2, the GPS receiver 3, the navigation device 4, the wireless communication device 5, and the storage device 6 are connected to the ECU 7 via an in-vehicle network conforming to a standard, such as a controller area network, so that they can communicate with each other. The vehicle control system 1 may further include a distance sensor (not illustrated), such as LiDAR or radar, which measures the distances from the vehicle 10 to objects around the vehicle 10.

The camera 2, which is an example of a sensor that generates a sensor signal representing surroundings of the vehicle 10, includes a two-dimensional detector constructed from an array of optoelectronic transducers, such as CCD or C-MOS, having sensitivity to visible light and a focusing optical system that forms an image of a target region on the two-dimensional detector. The camera 2 is mounted, for example, in the interior of the vehicle 10 so as to be oriented, for example, to the front of the vehicle 10. The camera 2 captures a region in front of the vehicle 10 every predetermined capturing period (e.g., 1/30 to 1/10 seconds), and generates images representing this region. Each image obtained by the camera 2 is an example of the sensor signal. The vehicle 10 may include multiple cameras taking pictures in different orientations or having different focal lengths.

Whenever generating an image, the camera 2 outputs the generated image to the ECU 7 via the in-vehicle network.

The GPS receiver 3 receives GPS signals from GPS satellites at predetermined intervals, and determines the position of the vehicle 10, based on the received GPS signals. The GPS receiver 3 outputs positioning information indicating the result of determination of the position of the vehicle 10 based on the GPS signals to the navigation device 4 and the ECU 7 via the in-vehicle network at predetermined intervals. Instead of the GPS receiver, the vehicle 10 may include a receiver that receives positioning signals from satellites of another satellite positioning system to determine the position of the vehicle 10.

The navigation device 4 executes a navigation process on the vehicle 10 in accordance with a navigation program executed on the device. For example, when the driver starts the navigation program and inputs a destination of the vehicle 10, the navigation device 4 searches for a travel route of the vehicle 10 from the current position of the vehicle 10 to the destination. To this end, the navigation device 4 refers to a route-search-purpose map stored therein and representing individual road sections and the connection relationship therebetween (hereafter, a "road map") to search for a travel route in accordance with a predetermined route searching technique, such as Dijkstra's algorithm. The travel route includes information indicating, for example, a road that the vehicle will travel before reaching the destination, a travel direction at a divergent point on the travel route, and the position of an intersection at which the vehicle will turn right or left. The navigation device 4 can use, for example, the position of the vehicle 10 based on the latest result of determination received from the GPS receiver 3 as the current position of the vehicle 10.

Upon determining a travel route of the vehicle 10, the navigation device 4 outputs information indicating the travel route to the ECU 7 via the in-vehicle network.

The wireless communication device 5 communicates with a wireless base station by wireless in conformity with a predetermined standard of mobile communications. The wireless communication device 5 receives traffic information indicating the traffic situation or construction information indicating the state of construction of the road being traveled by the vehicle 10 or the area therearound (e.g., information provided by the Vehicle Information and Communication System) from another device via the wireless base station. The wireless communication device 5 then outputs the received traffic information to the ECU 7 via the in-vehicle network. The construction information includes, for example, information on the places and times of day at which road construction is carried out. The wireless communication device 5 may receive a high-precision map of a predetermined region around the current position of the vehicle 10 used for autonomous driving control from a map server via the wireless base station, and output the received high-precision map to the storage device 6.

The storage device 6 includes, for example, a hard disk drive, a nonvolatile semiconductor memory, or an optical recording medium and an access device therefor. The storage device 6 stores a high-precision map, which is an example of the map including information on lanes of a road. The high-precision map includes, for example, information indicating the number of lines, road markings such as lane-dividing lines or stop lines, and signposts for each road included in a predetermined region represented in this map.

The storage device 6 may further include a processor for executing, for example, a process to update the high-precision map and a process related to a request from the ECU 7 to read out the high-precision map. For example, whenever the vehicle 10 moves a predetermined distance, the storage device 6 may transmit the current position of the vehicle 10 and a request to obtain the high-precision map to the map server via the wireless communication device 5, and receive a high-precision map of a predetermined region around the current position of the vehicle 10 from the map server via the wireless communication device 5. When receiving a request from the ECU 7 to read out the high-precision map, the storage device 6 cuts out that portion of the high-precision map stored therein which includes the current position of the vehicle 10 and which represents a region smaller than the predetermined region, and outputs the cut portion to the ECU 7 via the in-vehicle network.

The ECU 7 executes autonomous driving control of the vehicle 10. In the present embodiment, the ECU 7 compares an image obtained by the camera 2 with the high-precision map to detect a lane being traveled by the vehicle 10, and determines whether the position of the detected lane relative to an edge of the road being traveled by the vehicle 10 may differ from its actual position. The ECU 7 then determines start timing of an action required of the vehicle 10 before the vehicle 10 reaches a predetermined location being away from the current position of the vehicle 10 by a predetermined distance, based on the detected lane. When the position of the detected lane may differ from its actual position, the ECU 7 determines the start timing of the identified action in view of the possibility that the position of the detected lane is actually shifted.

As illustrated in FIG. 3, the ECU 7 includes a communication interface 21, a memory 22, and a processor 23. The communication interface 21, the memory 22, and the processor 23 may be separate circuits or a single integrated circuit.

The communication interface 21 includes an interface circuit for connecting the ECU 7 to the in-vehicle network. Whenever receiving an image from the camera 2, the communication interface 21 passes the received image to the processor 23. Whenever receiving positioning information from the GPS receiver 3, the communication interface 21 passes the positioning information to the processor 23. When receiving a travel route from the navigation device 4, the communication interface 21 passes the travel route to the processor 23. Additionally, when receiving, for example, traffic information via the wireless communication device 5 from another device, the communication interface 21 passes this information to the processor 23. Additionally, the communication interface 21 passes the high-precision map read from the storage device 6 to the processor 23.

The memory 22 includes, for example, volatile and non-volatile semiconductor memories, and stores various types of data used in a vehicle control process executed by the processor 23. For example, the memory 22 stores parameters including the focal length, the direction of image capturing, and the mounted position of the camera 2 and various parameters for specifying an object-detecting classifier used for detecting, for example, road features. The memory 22 further stores a travel route, positioning information of the vehicle 10, images of surroundings of the vehicle 10, and a high-precision map. Additionally, the memory 22 temporarily stores various types of data generated during the vehicle control process.

The processor 23 includes one or more central processing units (CPUs) and a peripheral circuit thereof. The processor 23 may further include another operating circuit, such as a logic-arithmetic unit, an arithmetic unit, or a graphics processing unit. The processor 23 executes the vehicle control process on the vehicle 10 at predetermined intervals.

FIG. 4 is a functional block diagram of the processor 23 related to the vehicle control process. The processor 23 includes a lane detection unit 31, an action identification unit 32, an error determination unit 33, an estimation unit 34, and a control unit 35. These units included in the processor 23 are, for example, functional modules implemented by a computer program executed on the processor 23, or may be dedicated operating circuits provided in the processor 23.

The lane detection unit 31 compares an image generated by the camera 2 and representing surroundings of the vehicle 10 (hereafter simply an "image") with the high-precision map to detect a lane being traveled by the vehicle 10. For example, with an assumption about the position and orientation of the vehicle 10, the lane detection unit 31 projects features on or near the road detected from an image onto the high-precision map or features on or near the road around the vehicle 10 represented in the high-precision map onto the image. The features on or near the road may be, for example, road markings such as lane-dividing lines or stop lines, or curbstones. The lane detection unit 31 then estimates the position of the vehicle 10 to be the position and orientation of the vehicle 10 for the case that the features detected from the image match those represented in the high-precision map the best.

The lane detection unit 31 may use initial values of the assumed position and orientation of the vehicle 10 and parameters of the camera 2, such as its focal length, height of the mounted position, and direction of image capturing, to determine the positions in the high-precision map or the image to which the features are projected. As the initial values of the position and orientation of the vehicle 10 used is the position of the vehicle 10 measured by the GPS receiver 3 or obtained by correcting, with odometry information, the position and orientation of the vehicle 10 estimated at the last detection of the travel lane. The lane detection unit 31 then calculates the degree of matching (e.g., a normalized cross-correlation value) between the features on or near the road detected from the image and those represented in the high-precision map.

The lane detection unit 31 repeats the above-described process while varying the assumed position and orientation of the vehicle 10. The lane detection unit 31 estimates the actual position of the vehicle 10 to be the position and orientation for the case that the degree of matching is a maximum. The lane detection unit 31 then refers to the high-precision map to identify the lane including the position of the vehicle 10 as the lane being traveled by the vehicle 10.

For example, the lane detection unit 31 may input an image into a classifier that has been trained to detect detection target features from an image, thereby detecting these features. As the classifier for detecting features, the lane detection unit 31 may use, for example, a deep neural network (DNN) having a convolutional neural network (CNN) architecture, such as Single Shot MultiBox Detector (SSD) or Faster R-CNN. This classifier may output confidence scores indicating the degrees of reliability of the respective detected features. The classifier detects a region in the image having a confidence score calculated for a predetermined feature higher than a predetermined detection threshold as an object region representing the predetermined feature.

The lane detection unit 31 notifies information indicating the detected lane to the action identification unit 32, the error determination unit 33, the estimation unit 34, and the control unit 35.

The action identification unit 32 identifies an action required of the vehicle 10 before the vehicle 10 reaches a predetermined location being away from the current position of the vehicle 10 by a predetermined distance (hereafter, a "target location"), based on the travel route of the vehicle 10. The identified action of the vehicle 10 includes an action to change the current travel state of the vehicle 10 into a different travel state, e.g., that lane change to go to a destination along the travel route which is caused by merging or diverging of a lane and a lane change to move to a lane to go in a particular direction (e.g., a lane for turning right or left).

For example, the action identification unit 32 refers to the high-precision map to determine whether a divergent location is included in a predetermined length (e.g., 1 km to 5 km) of section from the current position of the road being traveled by the vehicle 10 to go to a destination along the travel route. Instead of the high-precision map, the action identification unit 32 may refer to a road map similar to that used by the navigation device to search for the travel route to determine the presence or absence of such a divergent location. In this case, the road map may be prestored in the memory 22. When such a divergent location exists, the action identification unit 32 determines whether the lane being traveled by the vehicle 10 differs from a lane beyond the divergent location leading to the destination (hereafter, a "target lane"). When the travel lane differs from the target lane, the action identification unit 32 identifies a lane change from the travel lane to the target lane as an action required of the vehicle 10. Additionally, the action identification unit 32 sets the divergent location or the location a predetermined offset distance closer to the current position of the vehicle 10 than the divergent location as the target location. As the current position of the vehicle 10, the position of the vehicle 10 estimated by the lane detection unit 31 may be used.

Similarly, the action identification unit 32 refers to the high-precision map or the road map to determine whether an intersection at which the vehicle 10 will turn right or left to go to a destination along the travel route exists in the predetermined length of section from the current position. When such an intersection exists, the action identification unit 32 determines whether the lane being traveled by the vehicle 10 differs from a target lane for the vehicle 10 to turn right or left at this intersection to go to the destination. When the travel lane differs from the target lane, the action identification unit 32 identifies a lane change from the travel lane to the target lane as an action required of the vehicle 10. Additionally, the action identification unit 32 sets this intersection or the location a predetermined offset distance closer to the current position of the vehicle 10 than this intersection as the target location.

The action identification unit 32 generates information indicating the identified action. The information indicating the identified action includes information indicating the type of the action and the target location. The action identification unit 32 notifies the information indicating the identified action to the estimation unit 34 and the control unit 35.

The error determination unit 33 determines whether the position of the lane detected by the lane detection unit 31 relative to an edge of the road being traveled by the vehicle 10 may differ from its actual position.

Figure 5A:
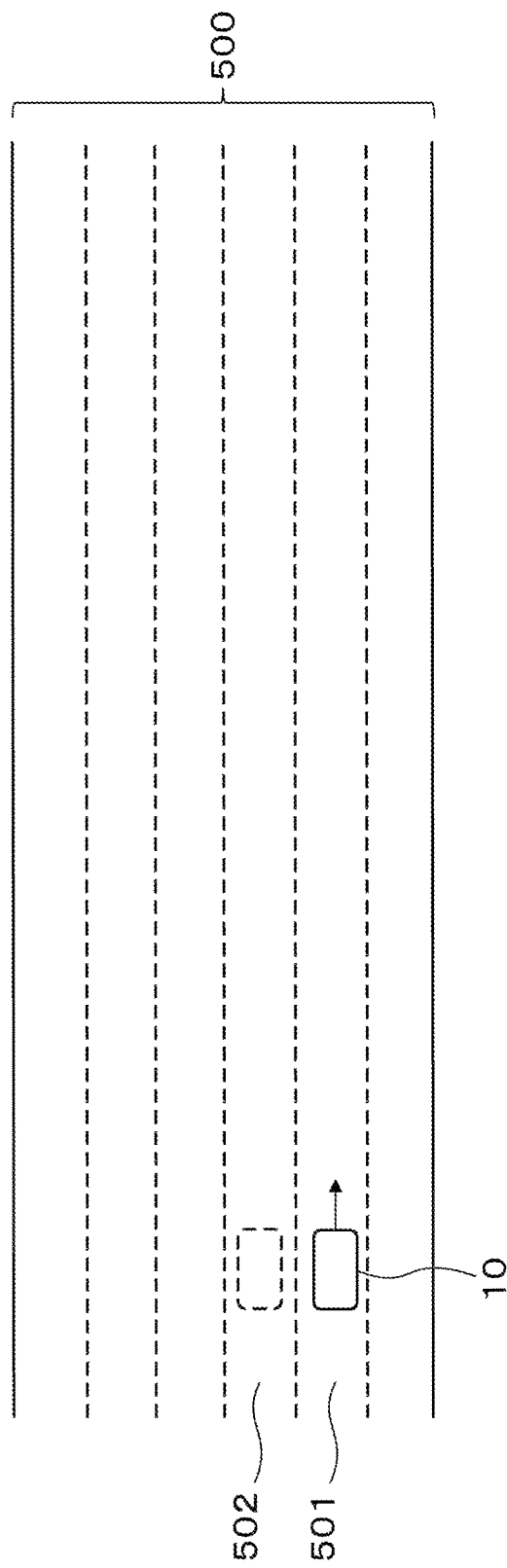
FIG. 5A illustrates an example in which the position of a detected travel lane relative to an edge of a road differs from its actual position.
Figure 5B:
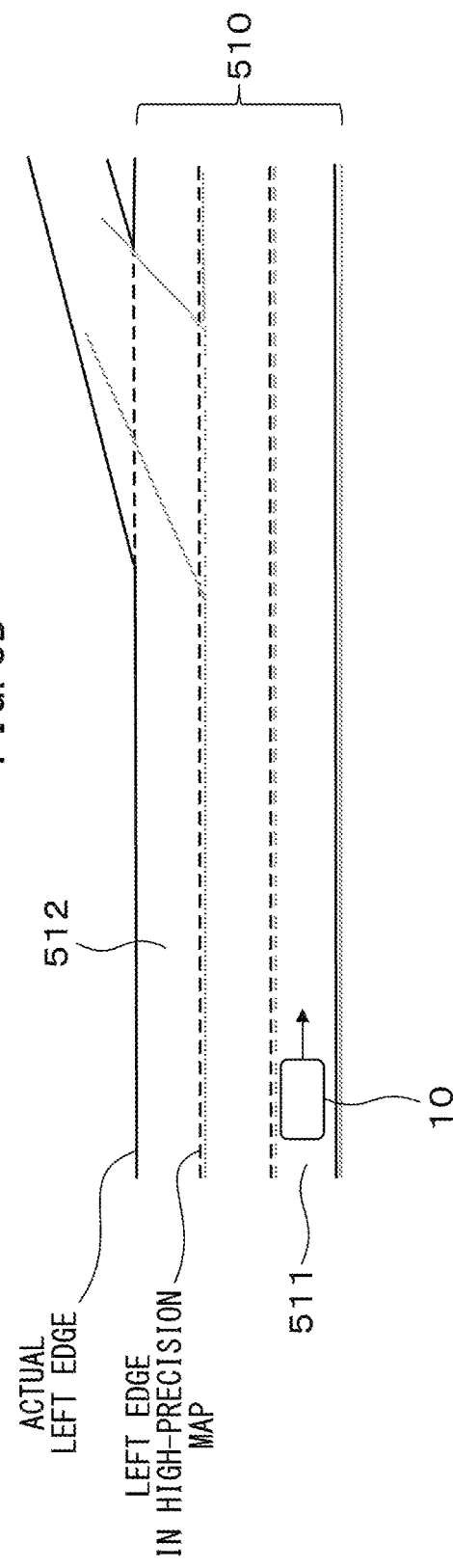
FIG. 5B illustrates an example in which the position of a detected travel lane relative to an edge of a road differs from its actual position.

FIGS. 5A and 5B illustrate examples in which the position of a detected travel lane differs from its actual position. In the example illustrated in FIG. 5A, of lanes of a road 500, the vehicle 10 is traveling on the second lane 501 from the right with respect to the travel direction of the vehicle 10. However, a lane 502 adjoining the lane 501 is erroneously detected as the travel lane. Thus the position of the detected lane differs from the actual position of the travel lane. Such erroneous detection of the travel lane may occur, for example, when the road being traveled by the vehicle 10 has many lanes or when it is difficult to distinguish a feature on the road, such as a lane-dividing line, because it is blurred. Erroneous detection of the travel lane may also occur when only relatively short time has elapsed since the start of detection of the travel lane, e.g., when the vehicle 10 has just entered the area covered by the high-precision map.

In the example illustrated in FIG. 5B, of lanes of a road 510, the vehicle 10 is traveling on the rightmost lane 511 with respect to the travel direction of the vehicle 10. In this example, the lane 511 is detected as the travel lane. However, the leftmost lane 512 of the road 510 has been added after the generation of the high-precision map used by the vehicle 10 for detecting the travel lane, and thus the road 510 in the high-precision map does not include the lane 512. As a result, the number of lanes recognized by the lane detection unit 31 between the travel lane 511 and the left edge of the road 510 differs from the actual number of lanes between the travel lane 511 and the actual left edge of the road 510. Thus the position of the detected lane relative to the left edge of the road 510 differs from its actual position. Such a discrepancy between the numbers of lanes on the left and right of the detected lane in the high-precision map and the actual environment may occur, for example, when the high-precision map is not updated with the latest road information or when construction is carried out on the road.

Thus, the error determination unit 33 determines whether the position of the detected lane relative to an edge of the road being traveled by the vehicle 10 may differ from its actual position, based on, for example, the structure of the road being traveled by the vehicle 10, circumstances of travel, and timing of generation or update of the high-precision map. More specifically, the error determination unit 33 determines whether the position of the detected lane may differ from its actual position, based on any of the determination processes described below. Execution of these determination processes enables the error determination unit 33 to correctly determine whether the position of the detected lane relative to an edge of the road being traveled by the vehicle 10 may differ from its actual position. The error determination unit 33 need not execute all of the determination processes described below, but execute at least one of them. In the following description, the fact that the position of the detected lane relative to an edge of the road being traveled by the vehicle 10 differs from its actual position may be simply referred to as the position of the detected lane differing from its actual position.

For example, the error determination unit 33 refers to construction information received from another device via the wireless communication device 5. When the construction information indicates that road construction is carried out during a predetermined period including the current time in a section from the current position of the vehicle 10 to the predetermined distance away, the error determination unit 33 determines that the position of the detected lane may differ from its actual position. This is because the road construction has changed the number of passable lanes and thereby the position of the detected lane may differ from its actual position.

Additionally, when the date and time of the latest update of the high-precision map is a predetermined period or more earlier than the current time, the error determination unit 33 determines that the position of the detected lane may differ from its actual position. Alternatively, when the high-precision map and the road map differ in road structure in a section from the current position of the vehicle 10 to the predetermined distance away, the error determination unit 33 may determine that the position of the detected lane may differ from its actual position. This is because the high-precision map does not correctly represent the road structure around the current position of the vehicle 10 and thereby the position of the detected lane may be mistaken.

Additionally, when a trajectory of another vehicle traveling ahead of the vehicle 10 in a section from the current position of the vehicle 10 to the predetermined distance away passes through an area in the high-precision map impassable to vehicles, the error determination unit 33 may determine that the position of the detected lane may differ from its actual position. This is because the leading vehicle cannot be traveling through the impassable area and thus the position of the detected lane is probably mistaken.

In this case, the error determination unit 33 detects vehicles around the vehicle 10 from time-series images obtained by the camera 2. To this end, the error determination unit 33 inputs the time-series images into a classifier that has been trained to detect a detection target object from an image, thereby detecting vehicles around the vehicle 10 from each of the time-series images. As such a classifier, the error determination unit 33 may use, for example, a DNN having a CNN architecture.

The error determination unit 33 tracks the vehicles detected from the time-series images to determine the trajectories of these vehicles. To this end, the error determination unit 33 applies a tracking process based on optical flow, such as the Lucas-Kanade method, to an object region representing a vehicle of interest in the latest image obtained by the camera 2 and object regions in past images, thereby tracking the vehicle represented in the object regions. To achieve this, the error determination unit 33 applies, for example, a filter for extracting characteristic points, such as SIFT or Harris operator, to the object region of interest, thereby extracting characteristic points from this object region. The error determination unit 33 then identifies those points in the object regions in the past images which correspond to the characteristic points in accordance with the applied tracking technique, thereby calculating the optical flow. Alternatively, the error determination unit 33 may apply another tracking technique applied for tracking a moving object detected from an image to the object region of interest in the latest image and the object regions in the past images, thereby tracking the vehicle represented in the object regions.

For each tracked vehicle, the error determination unit 33 executes viewpoint transformation, using information such as the position at which the camera 2 is mounted on the vehicle 10, thereby transforming the image coordinates of the tracked vehicle into coordinates in an aerial image ("aerial-image coordinates"). To this end, the error determination unit 33 can estimate the position of the detected vehicle at the time of acquisition of each image, using the position and orientation of the vehicle 10, an estimated distance to the detected vehicle, and the direction from the vehicle 10 to the detected vehicle at the time of acquisition of each image. The error determination unit 33 may obtain the position and orientation of the vehicle 10 from the lane detection unit 31. The error determination unit 33 can identify the direction from the vehicle 10 to the detected vehicle, based on the position of the object region including the detected vehicle in the image and the direction of the optical axis of the camera 2. Additionally, the estimated distance from the vehicle 10 to the detected vehicle is determined on the basis of the real-space size of the detected vehicle and the ratio of the size of the region of the vehicle in the image to a reference size of the vehicle in the image for the case that the distance to the vehicle is equal to a reference distance. The reference distance as well as the reference size in the image and the real-space size of the detected vehicle may be prestored, for example, in the memory 22. Additionally, the bottom position of an object region is supposed to correspond to the position at which the vehicle represented in this object region is in contact with the road surface. Thus the error determination unit 33 may estimate the distance to the vehicle represented in the object region, based on the direction from the camera 2 corresponding to the bottom of the object region and the height of the mounted position of the camera 2.

The error determination unit 33 superposes the trajectories of the vehicles determined as described above onto the high-precision map to determine whether these trajectories pass through the area impassable to vehicles. When the trajectory determined for any of the vehicles at least partially lies on the area impassable to vehicles, the error determination unit 33 determines that the position of the detected lane may differ from its actual position.

Additionally, the error determination unit 33 may determine that the position of the detected lane may differ from its actual position, until a certain time elapses or the vehicle 10 travels a certain distance from the start of detection of the travel lane. This is because the accuracy of detection of the travel lane may be insufficient immediately after the start of the process of detecting the travel lane.

Additionally, the error determination unit 33 determines whether the number of lanes represented in the high-precision map or an image generated by the camera 2 at the current position of the vehicle 10 is not less than a predetermined number. The predetermined number is set at, for example, any number not less than three, e.g., three to five. When the number of lanes is not less than the predetermined number and the detected lane is located within a predetermined range of the center of lanes at the current position of the vehicle 10, the error determination unit 33 determines that the position of the detected lane may differ from its actual position. This is because the position of the detected lane tends to be shifted when the vehicle 10 is traveling near the center of a road having many lanes.

Additionally, when the number of lanes at the current position of the vehicle 10 differs from the number of lanes at the position of the vehicle 10 a predetermined time ago by a predetermined number or more, the error determination unit 33 determines that the position of the detected lane may differ from its actual position. This is because the position of the detected lane tends to be shifted at a location where the number of lanes of the road being traveled by the vehicle 10 greatly changes.

Additionally, when the position of a predetermined feature detected from an image generated by the camera 2 differs from the position of a corresponding feature in the high-precision map relative to the position of the detected lane, the error determination unit 33 determines that the position of the detected lane may differ from its actual position. This is because such a discrepancy between the positions of a feature in the image and a corresponding feature in the high-precision is supposed to result from incorrectness of the estimated position of the vehicle 10, which may cause the estimated position of the travel lane to be mistaken. The error determination unit 33 may project features detected from the image onto the high-precision map by a technique similar to estimation of the position of the vehicle described in relation to the lane detection unit 31, and compare the positions of features in the image with those of corresponding features in the high-precision map.

Additionally, when a confidence score of a predetermined feature detected from an image generated by the camera 2 is not higher than a predetermined confidence-score threshold, the error determination unit 33 determines that the position of the detected lane may differ from its actual position. In this case, the confidence score may be one outputted by the classifier used by the lane detection unit 31. The predetermined confidence-score threshold is preferably set higher than the detection threshold used by the lane detection unit 31 for detecting features from an image. This is because the accuracy of detection of features around the vehicle 10 is insufficient and thereby the estimated position of the travel lane may be mistaken.

Additionally, the error determination unit 33 detects a vehicle traveling in that area relative to the position of the detected lane which is represented in an image generated by the camera 2 and which corresponds to an area in the high-precision map passable to the vehicle 10. When such a vehicle cannot be detected during a certain period, the error determination unit 33 determines that the position of the detected lane may differ from its actual position. It is supposed that an area passable to the vehicle 10 in the high-precision map is generally traveled by other vehicles. Thus, when no vehicle is detected in the area in the image corresponding to the passable area, estimation of the position of the vehicle 10 may be mistaken, which may cause the position of the travel lane to be mistaken. The error determination unit 33 may project the area passable to the vehicle 10 in the high-precision map onto the image by a technique similar to estimation of the position of the vehicle described in relation to the lane detection unit 31, and determine the area in the image corresponding to the passable area.

Additionally, the high-precision map may include information indicating a location at which detection of the travel lane is likely to fail (hereafter, an "error occurrence point"). In this case, when the current position of the vehicle 10 is within a predetermined range of an error occurrence point predefined in the high-precision map, the error determination unit 33 determines that the position of the detected lane may differ from its actual position.

The error determination unit 33 notifies the estimation unit 34 and the control unit 35 of the result of determination whether the position of the detected lane may differ from its actual position.

When being notified by the action identification unit 32 of the information indicating the identified action, the estimation unit 34 estimates a first required time, which is the time required for the identified action for the case that the vehicle 10 is traveling on the detected lane. Additionally, when it is determined that the position of the detected lane relative to an edge of the road being traveled by the vehicle 10 may differ from the actual position of the travel lane, the estimation unit 34 assumes that the position of the detected lane differs from the actual position by a predetermined number of lanes. The estimation unit 34 then estimates a second required time, which is the time required for the identified action under such an assumption. In the present embodiment, the estimation unit 34 assumes that the positions may differ by one lane to estimate the second required time, but may assume that they may differ by two or more lanes to estimate the second required time. For example, the estimation unit 34 may increase the predetermined number of lanes as the number of lanes included in the road being traveled by the vehicle 10 is greater. When the position of the detected lane may be shifted to either of the left and right sides with respect to the travel direction of the vehicle 10, the estimation unit 34 assumes that the position of the detected lane is shifted to the side such that the time required for the identified action is longer by the predetermined number of lanes to estimate the second required time. When the position of the detected lane may be shifted to only one of the left and right sides with respect to the travel direction of the vehicle 10, the estimation unit 34 assumes that the position is shifted to the one of the sides by the predetermined number of lanes to estimate the second required time. For example, when a three-dimensional structure, such as a guard rail, adjoining the left or right of the detected lane is represented in an image generated by the camera 2, the estimation unit 34 assumes that the position is shifted opposite to the structure by the predetermined number of lanes to estimate the second required time.

For example, the estimation unit 34 refers to a required-time table prestored in the memory 22 and indicating the relationship between the identified action and the time required for the action to estimate the first and second required times. For example, when the identified action is one or more lane changes from the travel lane to a target lane as described above, the estimation unit 34 refers to the required-time table to determine the time required for a lane change. The estimation unit 34 then multiplies the time required for a lane change by the number of lane changes required for moving from the detected lane to the target lane to estimate the first required time. Additionally, the estimation unit 34 multiplies the time required for a lane change by the number of lane changes required for moving from the position of the assumed erroneous travel lane to the target lane to estimate the second required time.

For each identified action, multiple required-time tables may be prepared according to the states of travel of the vehicle 10. For example, required-time tables may be separately prepared according to the speed of the vehicle 10, the legally permitted speed of the road being traveled by the vehicle 10, and the number of vehicles traveling on a lane adjoining the detected lane. In this case, the estimation unit 34 refers to the speed of the vehicle 10 measured by a vehicle speed sensor (not illustrated) provided for the vehicle 10, the legally permitted speed indicated in the high-precision map at the current position of the vehicle 10, or the number of vehicles detected from an image obtained by the camera 2 to select a required-time table to be used.

Instead of or in addition to the first required time, the estimation unit 34 may estimate a first required distance, which is the travel distance of the vehicle 10 required for the identified action for the case that the vehicle 10 is traveling on the detected lane. Additionally, instead of or in addition to the second required time, the estimation unit 34 may estimate a second required distance, which is the travel distance of the vehicle 10 required for the identified action for the case that the position of the detected lane is shifted by the predetermined number of lanes. In this case also, the estimation unit 34 refers to a required-distance table prestored in the memory 22 and indicating the relationship between the identified action and the distance required for the action to estimate the first and second required distances, as in the above-described embodiment.

For example, when the identified action is one or more lane changes from the travel lane to a target lane, the estimation unit 34 refers to the required-distance table to determine the distance required for a lane change. The estimation unit 34 then multiplies the distance required for a lane change by the number of lane changes required for moving from the detected lane to the target lane to estimate the first required distance. Additionally, the estimation unit 34 multiplies the distance required for a lane change by the number of lane changes required for moving from the position of the assumed erroneous travel lane to the target lane to estimate the second required distance. Two sections where two successive lane changes are respectively made may overlap. Thus the estimation unit 34 may multiply the overlap distance between two sections where two lane changes are respectively made by the total number of lane changes to be made minus one, and subtract the obtained distance from the first and second required distances calculated as described above, thereby modifying the first and second required distances. The overlap distance may be prestored in the memory 22.

For each identified action, multiple required-distance tables may be prepared according to the states of travel of the vehicle 10. For example, required-distance tables may be separately prepared according to the speed of the vehicle 10, the legally permitted speed of the road being traveled by the vehicle 10, and the number of vehicles traveling on a lane adjoining the detected lane. In this case, the estimation unit 34 refers to the speed of the vehicle 10 measured by the vehicle speed sensor (not illustrated), the legally permitted speed indicated in the high-precision map at the current position of the vehicle 10, or the number of vehicles detected from an image obtained by the camera 2 to select a required-distance table to be used.

The estimation unit 34 notifies the first and second required times or the first and second required distances to the control unit 35.

The control unit 35 controls the vehicle 10 so that the identified action will finish before the vehicle 10 reaches a target location of the identified action. To achieve this, when the position of the detected lane relative to an edge of the road being traveled by the vehicle 10 may differ from its actual position, the control unit 35 refers to the first and second required times or the first and second required distances. The control unit 35 then sets start timing of the identified action (hereafter, "action start timing"), based on the longer of the first and second required times or the longer of the first and second required distances.

More specifically, when the second required time is longer than the first required time, the control unit 35 sets the action start timing to a predetermined time earlier than the expected time at which the vehicle 10 reaches the target location, by the second required time or more. In contrast, when the first required time is longer than the second required time, the control unit 35 sets the action start timing to a predetermined time earlier than the expected time at which the vehicle 10 reaches the target location, by the first required time or more. The control unit 35 determines the distance from the current position of the vehicle 10 to the target location by referring to the high-precision map or the road map, and determines the expected time by dividing the distance by the average speed of the vehicle 10 in a preceding predetermined period.

Similarly, when the second required distance is longer than the first required distance, the control unit 35 sets the action start timing to the time at which the distance from the current position of the vehicle 10 to the target location becomes equal to the second required distance or the second required distance plus a predetermined offset distance. In contrast, when the first required distance is longer than the second required distance, the control unit 35 sets the action start timing to the time at which the distance from the current position of the vehicle 10 to the target location becomes equal to the first required distance or the first required distance plus a predetermined offset distance. The control unit 35 determines the distance from the current position of the vehicle 10 to the target location by referring to the high-precision map or the road map.

When it is determined that the position of the detected lane relative to an edge of the road being traveled by the vehicle 10 does not differ from its actual position, the control unit 35 sets the action start timing, based on the first required time or the first required distance, as described above.

From the action start timing, the control unit 35 controls components of the vehicle 10 so that the vehicle 10 will take the identified action. More specifically, the control unit 35 generates one or more planned trajectories of the vehicle 10 in a section (e.g., 500 m to 1 km) from the current position of the vehicle 10 to a predetermined distance away, according to the identified action. Each planned trajectory is represented, for example, as a set of target positions of the vehicle 10 at respective times during travel of the vehicle 10 through the predetermined section. The control unit 35 controls components of the vehicle 10 so that it will travel along the planned trajectory.

When the identified action is one or more lane changes from the travel lane to a target lane as in the above-described examples, the control unit 35 generates a planned trajectory so that the lane changes will be made. Specifically, the control unit 35 generates a planned trajectory so that the vehicle 10 will not collide with objects around the vehicle 10, in particular, with other vehicles traveling on the travel lane and the adjoining lane on the side of the target lane. To this end, the control unit 35 detects objects around the vehicle 10 from time-series images obtained by the camera 2. The control unit 35 then tracks the objects detected from the time-series images, and estimates predicted trajectories of the respective objects to a predetermined time ahead from the trajectories obtained from the result of tracking. The control unit 35 may execute a process similar to determination of the trajectories of vehicles by the error determination unit 33 to determine the trajectories of the objects around the vehicle 10. Alternatively, the control unit 35 may obtain the trajectories of the objects around the vehicle 10 from the error determination unit 33. The control unit 35 can estimate the predicted trajectories of the tracked objects to a predetermined time ahead by executing a prediction process with, for example, a Kalman filter or a particle filter, based on the trajectories of the objects in a preceding predetermined period.

The control unit 35 generate a planned trajectory, based on the predicted trajectories of the tracked objects, so that a predicted distance between the vehicle 10 and each object will be not less than a predetermined distance until the predetermined time ahead and that each lane change will finish within a distance required for a lane change.

Upon setting a planned trajectory, the control unit 35 controls components of the vehicle 10 so that it will travel along the planned trajectory. For example, the control unit 35 determines the acceleration of the vehicle 10 according to the planned trajectory and the current speed of the vehicle 10 measured by the vehicle speed sensor (not illustrated), and sets the degree of accelerator opening or the amount of braking so that the acceleration of the vehicle 10 will be equal to the determined acceleration. The control unit 35 then determines the amount of fuel injection according to the set degree of accelerator opening, and outputs a control signal depending on the amount of fuel injection to a fuel injector of an engine of the vehicle 10. Alternatively, the control unit 35 determines the electric power to be supplied to a motor, according to the set degree of accelerator opening, and controls a driving circuit of the motor so that the determined electric power will be supplied to the motor. Additionally, the control unit 35 outputs a control signal depending on the set amount of braking to the brake of the vehicle 10. When changing the direction of the vehicle 10 in order for the vehicle 10 to travel along the planned trajectory, the control unit 35 determines the steering angle of the vehicle 10 according to the planned trajectory. The control unit 35 then outputs a control signal depending on the steering angle to an actuator (not illustrated) that controls the steering wheel of the vehicle 10.

Figure 6:
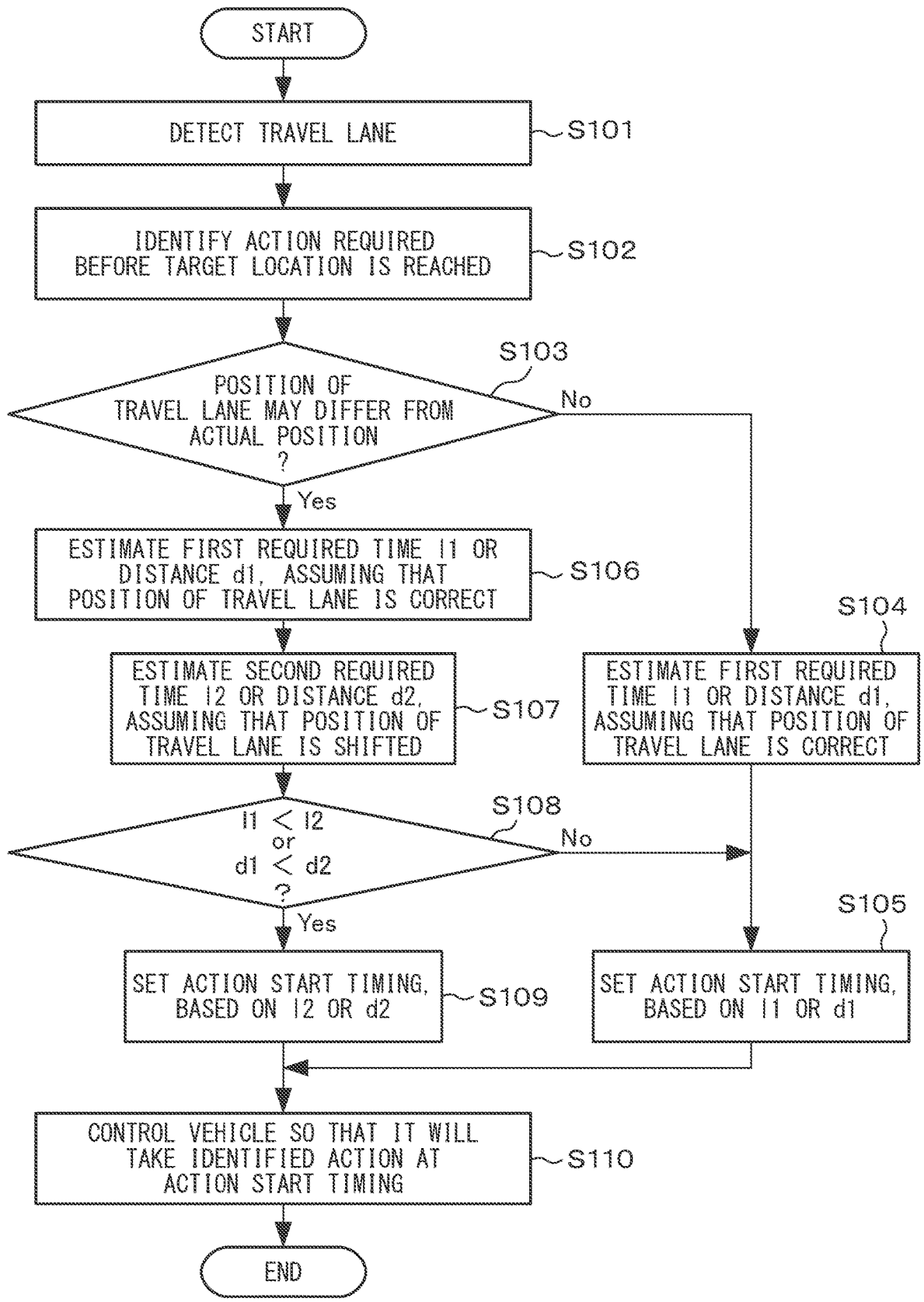
FIG. 6 is an operation flowchart of the vehicle control process.

FIG. 6 is an operation flowchart of the vehicle control process executed by the processor 23. The processor 23 executes the vehicle control process in accordance with this operation flowchart at predetermined intervals.

The lane detection unit 31 of the processor 23 detects a lane being traveled by the vehicle 10 (step S101). The action identification unit 32 of the processor 23 identifies an action required of the vehicle 10 before the vehicle 10 reaches a target location being away from the current position of the vehicle 10 by a predetermined distance (step S102).

Additionally, the error determination unit 33 of the processor 23 determines whether the position of the detected lane relative to an edge of the road being traveled by the vehicle 10 may differ from its actual position (step S103).

When it is determined that the position of the detected lane does not differ from its actual position (No in step S103), the estimation unit 34 of the processor 23 assumes that the position of the travel lane is correct. Under this assumption, the estimation unit 34 estimates a first required time t1 or a first required distance d1 for the identified action (step S104). The control unit 35 of the processor 23 sets action start timing, based on the first required time t1 or distance d1, so that the identified action will finish before reaching the target location (step S105).

When it is determined that the position of the detected lane may differ from its actual position (Yes in step S103), the estimation unit 34 estimates a first required time t1 or a first required distance d1 on the assumption that the position of the travel lane is correct (step S106). The estimation unit 34 also estimates a second required time t2 or a second required distance d2 for the identified action on the assumption that the position of the detected lane is shifted by a predetermined number of lanes (step S107).

The control unit 35 determines whether the second required time t2 is longer than the first required time t1 or whether the second required distance d2 is longer than the first required distance d1 (step S108). When it is determined that the second required time t2 is longer than the first required time t1 or that the second required distance d2 is longer than the first required distance d1 (Yes in step S108), the control unit 35 sets action start timing, based on the second required time t2 or distance d2, so that the identified action will finish before reaching the target location (step S109).

When it is determined that the first required time t1 is not shorter than the second required time t2 or that the first required distance d1 is not shorter than the second required distance d2 (No in step S108), the control unit 35 sets action start timing, based on the first required time t1 or distance d1, so that the identified action will finish before reaching the target location (step S105).

After step S105 or S109, the control unit 35 controls the vehicle 10 so that it will take the identified action from the action start timing (step S110). After step S110, the processor 23 terminates the vehicle control process.

As has been described above, the vehicle controller determines whether the position of a detected travel lane relative to an edge of the road being traveled by the vehicle may differ from its actual position. The vehicle controller further estimates a first required time or a first required distance for finishing the identified action for the case that the position of the detected lane is correct. Additionally, the vehicle controller estimates a second required time or a second required distance for finishing the identified action for the case that the position of the detected lane is actually shifted by a predetermined number of lanes. The vehicle controller then sets action start timing, based on the second required time or the second required distance, when the position of the detected lane may differ from its actual position and the second required time or the second required distance is longer than the first required time or the first required distance. In this way, the vehicle controller enables the vehicle to finish the identified action before a target position or timing even if the position of the detected lane is incorrect.

A computer program for achieving the functions of the processor 23 of the ECU 7 according to the embodiment or modified examples may be provided in a form recorded on a computer-readable and portable medium, such as a semiconductor memory, a magnetic recording medium, or an optical recording medium.

As described above, those skilled in the art may make various modifications according to embodiments within the scope of the present invention.

What is claimed is:

1. A vehicle controller comprising:
a memory storing non-transitory computer executable program instructions;
a processor configured to execute the stored computer executable program instructions to:
automatically compare a sensor signal representing surroundings of a vehicle with a map including information on lanes of a road being traveled by the vehicle to detect a lane being traveled by the vehicle among the lanes, the sensor signal being obtained by a sensor mounted on the vehicle,
automatically determine whether a position of the detected lane relative to an edge of the road may differ from an actual position based on information received by the processor,
automatically identify an action required of the vehicle before the vehicle reaches a predetermined location being away from the current position of the vehicle by a predetermined distance, based on a travel route of the vehicle,
estimate a first required time or a first required distance for the action for the case that the position of the detected lane relative to the edge of the road is correct,
estimate a second required time or a second required distance for the action for the case that the position of the detected lane relative to the edge of the road differs from the actual position,
automatically set start timing of the action, based on the second required time or the second required distance, so that the action will finish before the vehicle reaches the predetermined location, when the position of the detected lane relative to the edge of the road may differ from the actual position and the second required time or the second required distance is longer than the first required time or the first required distance,
automatically sets the start timing of the action, based on the first required time or the first required distance, so that the action will finish before the vehicle reaches the predetermined location, when the position of the detected lane relative to the edge of the road does not differ from the actual position or when the first required time or the first required distance is longer than the second required time or the second required distance; and
automatically execute the action based on the set start timing.

2. The vehicle controller according to claim 1, wherein the processor determines that the position of the detected lane relative to the edge of the road may differ from the actual position, when construction information received from another device indicates that road construction is carried out during a predetermined period including the current time in a section from the current position of the vehicle to the predetermined distance away.

3. The vehicle controller according to claim 1, wherein the processor determines that the position of the detected lane relative to the edge of the road may differ from the actual position, when the date and time of the latest update of the map is a predetermined period or more earlier than the current time or when the map and a route-search-purpose map used by a navigation device for searching for the travel route of the vehicle differ in road structure in a section from the current position of the vehicle to the predetermined distance away.

4. The vehicle controller according to claim 1, wherein the processor determines that the position of the detected lane relative to the edge of the road may differ from the actual position, when a trajectory of another vehicle in a section from the current position of the vehicle to the predetermined distance away passes through an area in the map impassable to the vehicle.

5. The vehicle controller according to claim 1, wherein the processor determines that the position of the detected lane relative to the edge of the road may differ from the actual position, until a certain time elapses or the vehicle travels a certain distance from the start of detection of the lane being traveled by the vehicle.

6. The vehicle controller according to claim 1, wherein the processor determines that the position of the detected lane relative to the edge of the road may differ from the actual position, when the number of lanes represented in the map or the sensor signal at the current position of the vehicle is not less than a predetermined number and the detected lane is located within a predetermined range of the center of lanes of the road at the current position of the vehicle.

7. The vehicle controller according to claim 1, wherein the processor determines that the position of the detected lane relative to the edge of the road may differ from the actual position, when the number of lanes at the current position differs from the number of lanes at the position of the vehicle a predetermined time ago by a predetermined number or more.

8. The vehicle controller according to claim 1, wherein the processor determines that the position of the detected lane relative to the edge of the road may differ from the actual position, when the position of a predetermined feature detected from the sensor signal differs from the position of a corresponding feature in the map relative to the position of the detected lane.

9. The vehicle controller according to claim 1, wherein the processor determines that the position of the detected lane relative to the edge of the road may differ from the actual position, when a confidence score of a predetermined feature detected from the sensor signal is not higher than a predetermined confidence-score threshold.

10. The vehicle controller according to claim 1, wherein the processor determines that the position of the detected lane relative to the edge of the road may differ from the actual position, when no vehicle traveling in an area relative to the position of the detected lane can be detected during a certain period, the area being represented by the sensor signal and corresponding to an area in the map passable to the vehicle.

11. The vehicle controller according to claim 1, wherein the processor determines that the position of the detected lane relative to the edge of the road may differ from the actual position, when the current position of the vehicle is within a predetermined range of an error occurrence point predefined in the map.

12. A method for controlling a vehicle, comprising:
executing stored non-transitory computer readable program instructions with a processor, the processor:
automatically comparing a sensor signal representing surroundings of the vehicle with a map including information on lanes of a road being traveled by the vehicle to detect a lane being traveled by the vehicle among the lanes, the sensor signal being obtained by a sensor mounted on the vehicle;
automatically determining whether a position of the detected lane relative to an edge of the road may differ from an actual position based on information received by the processor;
automatically identifying an action required of the vehicle before the vehicle reaches a predetermined location being away from the current position of the vehicle by a predetermined distance, based on a travel route of the vehicle;
estimating a first required time or a first required distance for the action for the case that the position of the detected lane relative to an edge of the road is correct;
estimating a second required time or a second required distance for the action for the case that the position of the detected lane relative to the edge of the road differs from the actual position;
automatically setting start timing of the action, based on the second required time or the second required distance, so that the action will finish before the vehicle reaches the predetermined location, when the position of the detected lane relative to the edge of the road may differ from the actual position and the second required time or the second required distance is longer than the first required time or the first required distance; and
automatically setting the start timing of the action, based on the first required time or the first required distance, so that the action will finish before the vehicle reaches the predetermined location, when the position of the detected lane relative to the edge of the road does not differ from the actual position or when the first required time or the first required distance is longer than the second required time or the second required distance; and
automatically executing the action based on the set start timing.

13. A non-transitory recording medium that stores a computer program for controlling a vehicle, the computer program causing a processor mounted on the vehicle to execute stored non-transitory computer readable program instructions to execute a process comprising:
automatically comparing a sensor signal representing surroundings of the vehicle with a map including information on lanes of a road being traveled by the vehicle to detect a lane being traveled by the vehicle among the lanes, the sensor signal being obtained by a sensor mounted on the vehicle;
automatically determining whether a position of the detected lane relative to an edge of the road may differ from an actual position based on information received by the processor;
automatically identifying an action required of the vehicle before the vehicle reaches a predetermined location being away from the current position of the vehicle by a predetermined distance, based on a travel route of the vehicle;
estimating a first required time or a first required distance for the action for the case that the position of the detected lane relative to the edge of the road is correct;
estimating a second required time or a second required distance for the action for the case that the position of the detected lane relative to the edge of the road differs from the actual position;
automatically setting start timing of the action, based on the second required time or the second required distance, so that the action will finish before the vehicle reaches the predetermined location, when the position of the detected lane relative to the edge of the road may differ from the actual position and the second required time or the second required distance is longer than the first required time or the first required distance;
automatically setting the start timing of the action, based on the first required time or the first required distance, so that the action will finish before the vehicle reaches the predetermined location, when the position of the detected lane relative to the edge of the road does not differ from the actual position or when the first required time or the first required distance is longer than the second required time or the second required distance; and
automatically executing the action based on the set start timing.

* * * * *